United States Patent
Keall et al.

(10) Patent No.: US 9,058,685 B2
(45) Date of Patent: Jun. 16, 2015

(54) METHOD AND SYSTEM FOR CONTROLLING A 3D PROCESSOR USING A CONTROL LIST IN MEMORY

(75) Inventors: Gary Keall, Long Clawson (GB); Giles Edkins, Cambridge (GB); Eben Upton, Cambridge (GB); James Adams, Cambridge (GB)

(73) Assignee: Broadcom Corporation, Irvine, CA (US)

(*) Notice: Subject to any disclaimer, the term of this patent is extended or adjusted under 35 U.S.C. 154(b) by 452 days.

(21) Appl. No.: 12/942,626

(22) Filed: Nov. 9, 2010

(65) Prior Publication Data

US 2011/0221743 A1 Sep. 15, 2011

Related U.S. Application Data

(60) Provisional application No. 61/312,988, filed on Mar. 11, 2010.

(51) Int. Cl.
*G06T 15/00* (2011.01)

(52) U.S. Cl.
CPC .................................. *G06T 15/005* (2013.01)

(58) Field of Classification Search
CPC ......... G06T 19/00; G06T 17/20; G06T 17/00; G06T 15/10; G06T 15/00
USPC ........... 345/419, 503, 505, 506; 382/303, 304
See application file for complete search history.

(56) References Cited

U.S. PATENT DOCUMENTS

| | | | | |
|---|---|---|---|---|
| 5,592,601 A * | 1/1997 | Kelley et al. | .................. | 345/443 |
| 6,798,410 B1 * | 9/2004 | Redshaw et al. | .............. | 345/427 |
| 7,102,646 B1 * | 9/2006 | Rubinstein et al. | ........... | 345/570 |
| 7,668,186 B1 * | 2/2010 | Nelson et al. | ................. | 370/412 |
| RE44,443 E * | 8/2013 | Staats et al. | ................... | 710/107 |
| 2002/0083298 A1 * | 6/2002 | Cook et al. | ....................... | 712/25 |
| 2004/0130552 A1 * | 7/2004 | Duluk et al. | ................... | 345/506 |
| 2004/0218760 A1 * | 11/2004 | Chaudhuri | .................... | 380/217 |
| 2007/0091108 A1 * | 4/2007 | Spicer | ........................... | 345/582 |
| 2007/0146378 A1 * | 6/2007 | Sorgard et al. | ................ | 345/581 |
| 2007/0172134 A1 * | 7/2007 | Namera | ........................ | 382/232 |
| 2008/0007560 A1 * | 1/2008 | Howson | ........................ | 345/531 |
| 2008/0186318 A1 * | 8/2008 | Redshaw et al. | .............. | 345/537 |
| 2009/0058848 A1 * | 3/2009 | Howson | ........................ | 345/418 |
| 2009/0066694 A1 * | 3/2009 | Redshaw et al. | .............. | 345/423 |
| 2009/0174706 A1 * | 7/2009 | Howson | ........................ | 345/419 |
| 2010/0007662 A1 * | 1/2010 | Cox et al. | ....................... | 345/420 |
| 2011/0148892 A1 * | 6/2011 | Shreiner et al. | ............... | 345/545 |

* cited by examiner

*Primary Examiner* — Todd Buttram
(74) *Attorney, Agent, or Firm* — Brinks Gilson & Lione

(57) ABSTRACT

A graphics processing device generates control lists for controlling processing of 3D graphics. Control lists comprise primitive data for the 3D graphics, pointers to primitive data and control data. Tags that correspond to records within the control lists may be utilized for the control of processing. The graphics processing device may comprise a 3D pipeline comprising parallel processors. Processing is performed on a tile by tile basis and comprises a tile binning phase and/or a tile rendering phase. The two phases of processing may be performed in parallel on different sets of data. Control lists comprise a main list and/or sub-lists, for example, tile lists. Control lists may comprise links to other lists. Processing control may advance through the control lists without interaction from a driver and/or from a processor that is external to the graphics processing device.

20 Claims, 8 Drawing Sheets

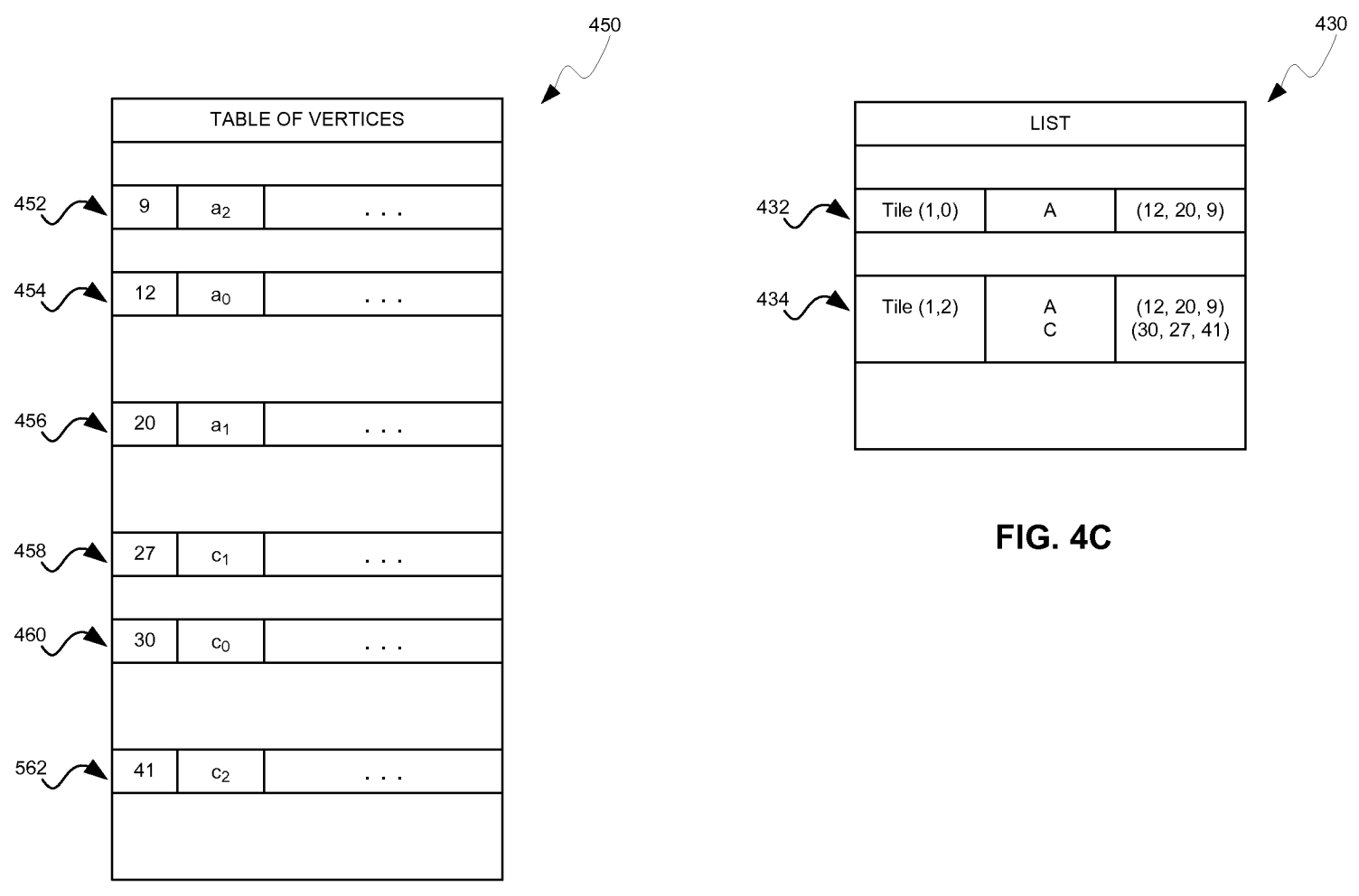

| | | |
|---|---|---|
| | LIST | |
| Tile (1,0) | A | (12, 20, 9) |
| Tile (1,2) | A<br>C | (12, 20, 9)<br>(30, 27, 41) |

430

432 → Tile (1,0)
434 → Tile (1,2)

FIG. 4C

| TABLE OF VERTICES | | |
|---|---|---|
| 9 | $a_2$ | ... |
| 12 | $a_0$ | ... |
| 20 | $a_1$ | ... |
| 27 | $c_1$ | ... |
| 30 | $c_0$ | ... |
| 41 | $c_2$ | ... |

METHOD AND SYSTEM FOR CONTROLLING A 3D PROCESSOR USING A CONTROL LIST IN MEMORY

CROSS-REFERENCE TO RELATED APPLICATIONS/INCORPORATION BY REFERENCE

This application makes reference to, claims priority to, and claims the benefit of U.S. Provisional Application Ser. No. 61/312,988, filed on Mar. 11, 2010 which is incorporated herein by reference in its entirety.

This application also makes reference to:
U.S. patent application Ser. No. 61/287,269 which was filed on Dec. 17, 2009;
U.S. patent application Ser. No. 61/311,640 which was filed on Mar. 8, 2010;
U.S. patent application Ser. No. 61/315,599 which was filed on Mar. 19, 2010;
U.S. patent application Ser. No. 61/328,541 which was filed on Apr. 27, 2010;
U.S. patent application Ser. No. 61/321,244 which was filed on Apr. 6, 2010;
U.S. patent application Ser. No. 61/315,620 which was filed on Mar. 19, 2010;
U.S. patent application Ser. No. 61/315,637 which was filed on Mar. 19, 2010; and
U.S. patent application Ser. No. 61/326,849 which was filed on Apr. 22, 2010.

Each of the above stated applications is hereby incorporated herein by reference in its entirety.

FIELD OF THE INVENTION

Certain embodiments of the invention relate to communication systems. More specifically, certain embodiments of the invention relate to controlling a 3D processor using a control list in memory.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for controlling a 3D processor using a control list in memory, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a block diagram that illustrates exemplary vertex information that may be utilized during a tile binning phase and/or during a tile rendering phase, in accordance with an embodiment of the invention.

FIG. 4C is a block diagram that illustrates exemplary index information that may be encoded during a tile binning phase of tile mode graphics rendering, in accordance with an embodiment of the invention.

DETAILED DESCRIPTION OF THE INVENTION

Certain embodiments of the invention can be found in a method and system for controlling a 3D processor using a control list in memory. One or more processors and/or circuits in a graphics processing device may be operable to generate one or more control lists that may correspond to 3D graphics to be processed. Records within the one or more control lists may comprise primitive data for the 3D graphics and/or pointers to the primitive data. In addition, the records may comprise control data for processing the primitive data. Processing of the 3D graphics may be controlled utilizing the records within the generated control lists. The graphics processing device may comprise one or more parallel processors that may process portions of the 3D graphics in parallel. The processing may be controlled utilizing one or more tags that may correspond to one or more of the records within the generated control lists. The 3D graphics may be processed on a tile by tile basis, wherein a tile may comprise a portion of the 3D graphics and a 3D frame may comprise a plurality of the tiles. Furthermore, the 3D graphics may be processed utilizing a tile binning phase and/or a tile rendering phase. A tile binning phase for one portion of the 3D graphics may be performed in parallel with a tile rendering phase for another portion of the 3D graphics. One or more of the control lists may comprise a main control list and/or one or more control sub-lists. One or more of the control lists may comprise a tile list. One or more of the control lists may comprise one or more links to one or more other lists. Processing control may be advanced through one or more of the control lists without interaction from a driver and/or from a processor that is external to the graphics processing device. The tile binning phase may be referred to as tile binning, primitive binning and/or binning phase, for example. The tile rendering phase may be referred to as pixel rendering phase, primitive pixel rendering and/or rendering phase for example.

Figure 1A:
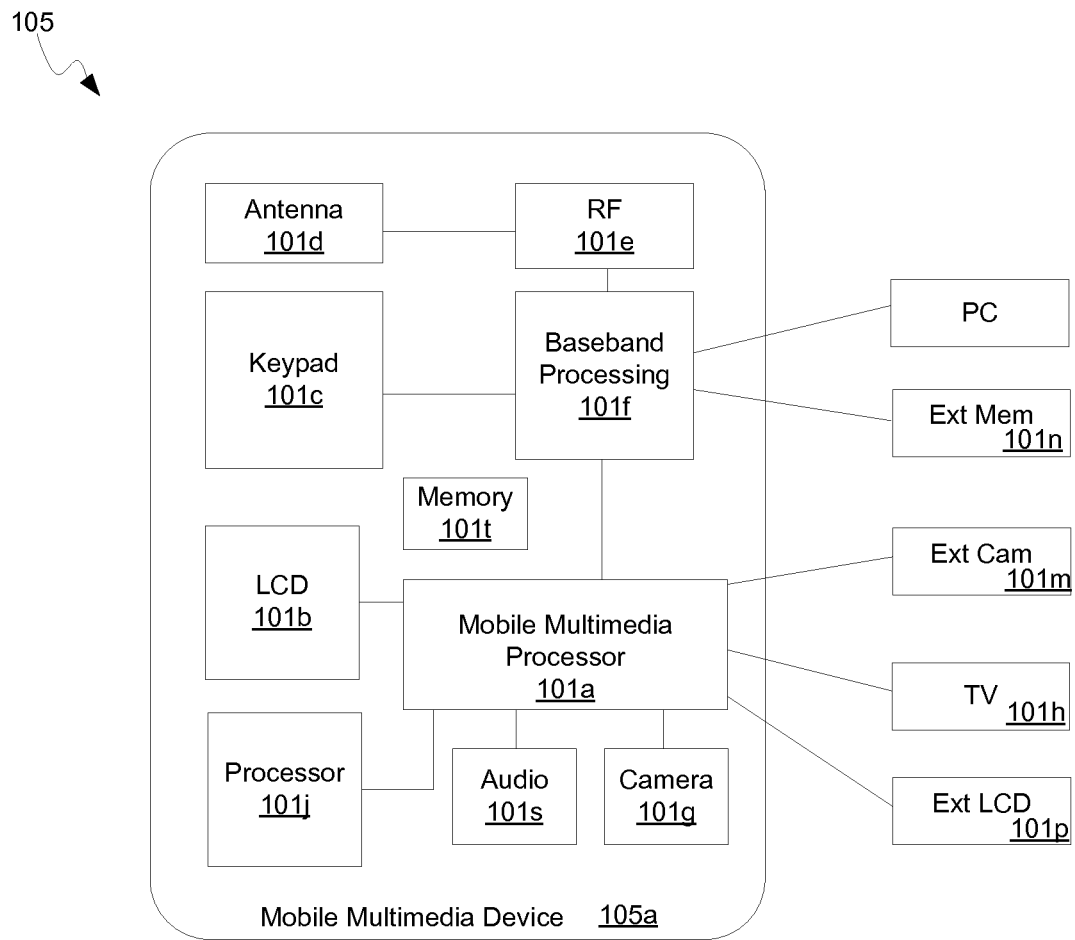
FIG. 1A is a block diagram of an exemplary multimedia system that is operable to control tile mode 3D graphics rendering utilizing 3D pipeline control lists, in accordance with an embodiment of the invention.

FIG. 1A is a block diagram of an exemplary multimedia system that is operable to control tile mode 3D graphics rendering utilizing 3D pipeline control lists, in accordance with an embodiment of the invention. Referring to FIG. 1A, there is shown a mobile multimedia system 105 that comprises a mobile multimedia device 105a, a TV 101h, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, a memory 101t, a processor 101j, an antenna 101d, an audio block 101s, a radio frequency (RF) block 101e, a baseband processing block 101f, an LCD display 101b, a keypad 101c, and a camera 101g.

The MMP 101a may comprise suitable logic, circuitry, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD display 101p. The MMP 101a may be communicatively coupled to the memory 101t and/or the external memory 101n.

The tile based graphics rendering processes may be managed utilizing control lists. The control lists may comprise one or more of processing instructions, register settings, tile lists and or vertex data for example. The MMP 101a may render the vertex data by stepping through the control lists. Register settings and instructions from the control lists may be utilized to configure the MMP 101a and to manage the flow of data to various modules in the MMP 101a and/or to external memory, during processing. The MMP 101a may perform shading on data according to the instructions in the control list and may store output in the memory 101t and/or in the external memory 101n for example. In addition, tile lists that may be utilized in the control lists, may be stored in the memory 101n.

The processor 101J may comprise suitable logic, circuitry, interfaces, and/or code that may be operable to control processes in the mobile multimedia system 105. Although not shown in FIG. 1A, the processor 101J may be coupled to a plurality of devices in and/or coupled to the mobile multimedia system 105.

In operation, The MMP 101a may comprise suitable circuitry, logic, interfaces and/or code that may be operable to perform tile based, two dimensional (2D) and/or three dimensional (3D) graphics rendering. The graphics rendering may be performed in two phases, a tile binning phase and a tile rendering phase. The tile binning phase may comprise coordinate-only vertex shading, whereas the pixel rendering phase may comprise full vertex shading.

3D graphics data represented in modeling space may comprise a plurality of geometric primitives. During the coordinate shading step of the tile binning phase, geometric primitives in 3D modeling space are transformed to a two dimensional screen space. The two dimensional screen space may be divided into a plurality of regions. The regions may be referred to as tiles or bins. The MMP 101a may determine which primitives, or portions of a primitive, that overlap ones of the plurality of tiles (or bins). The MMP 101a may generate a tile list for each tile. A tile list may comprise information about the primitives that overlap a corresponding tile (or bin). Once the primitives are associated with a bin in a tile list the second phase, comprising tile rendering may be performed to render pixels with color, light, and/or texture, for example.

The mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

Figure 1B:
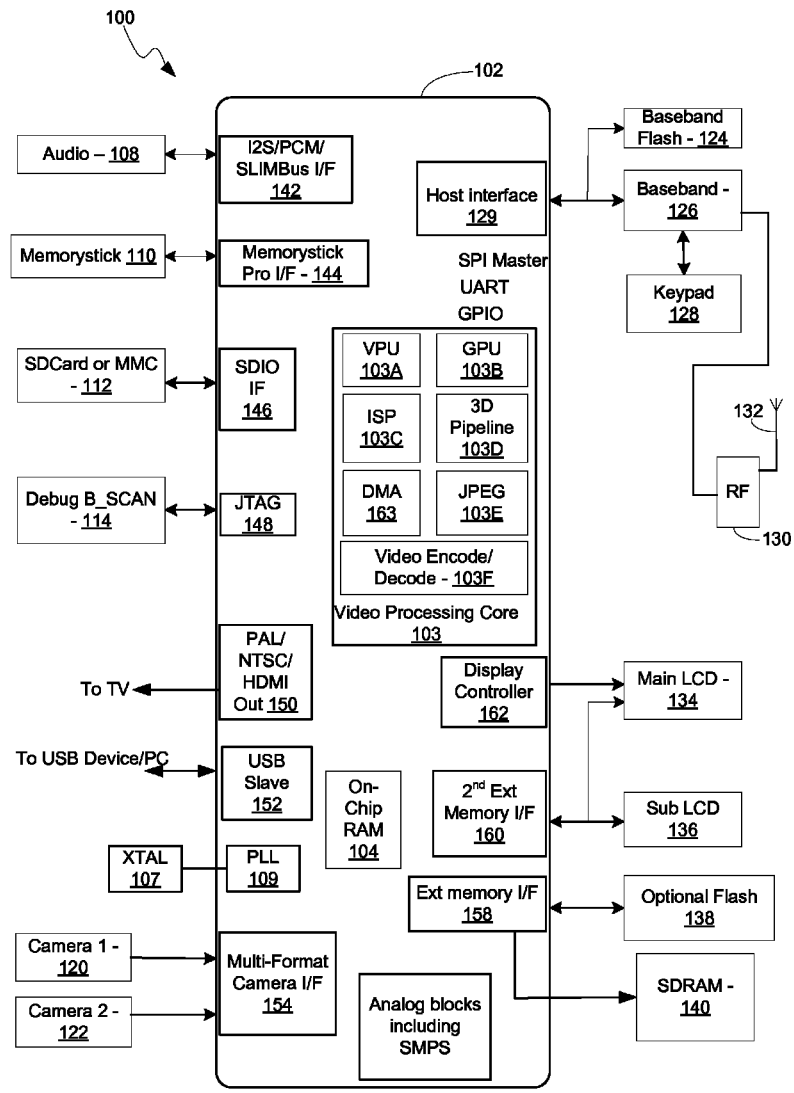
FIG. 1B is a block diagram of an exemplary multimedia processor comprising a video core that is operable to control tile mode 3D graphics rendering utilizing 3D pipeline control lists, in accordance with an embodiment of the invention.

FIG. 1B is a block diagram of an exemplary multimedia processor comprising a video core that is operable to control tile mode 3D graphics rendering utilizing 3D pipeline control lists, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a video processing unit (VPU) 103A, a graphic processing unit (GPU) 103B, an image sensor pipeline (ISP) 103C, a 3D pipeline 103D, a direct memory access (DMA) controller 163, a joint photographic experts group (JPEG) encoding/decoding module 103E, and a video encoding/decoding module 103F. The mobile multimedia processor 102 may also comprise on-chip RAM 104, a phase locked loop (PLL) 109, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a display controller 162, an external memory I/F 158, and a second external memory I/F 160.

The video processing core 103 may comprise suitable logic, circuitry, interfaces, and/or code that may be operable to perform video processing of data. The on-chip RAM 104 and the SDRAM 140 comprise suitable logic, circuitry interfaces and/or code that may be adapted to store data such as image or video data. For example, the on-chip RAM 104 and/or the SDRAM 140 may be operable to store tables of vertex attributes and/or one or more tile lists that may be read into the video processing core 103 and/or the 3D pipeline 103d during tile based pixel rendering. The tile lists may be placed within a control list or may be linked to from a control list.

The VPU 103a may comprise suitable logic, circuitry, interfaces and/or code that may be operable for data processing while maintaining high throughput and low power consumption.

The image sensor pipeline (ISP) 103C may comprise suitable logic, circuitry, interfaces and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable logic, circuitry, interfaces and/or code that may be operable to render 2D and/or 3D graphics. The 3D pipeline 103D may perform a plurality of processing techniques comprising vertex processing, rasterizing, early-Z culling, interpolation, texture lookups, pixel shading, depth test, stencil operations and color blend, for example. In this regard, the 3D pipeline 103D may be operable to perform tile mode graphics rendering. The graphics rendering may comprise two phases, a tile binning phase and a rendering phase. The 3D pipeline 103D may generate a plurality of tile lists during the binning phase. The tile lists may comprise index lists. The indices may point to vertex attributes that may be stored in a table. Contents of the tile lists may be compressed. Control lists, tile lists and/or the table of vertex attributes may be stored in the on-chip RAM 104 and/or in the SDRAM 140, for example. The 3D pipeline 103D may read the control lists, the tile lists and/or the vertex attributes and may perform tile mode pixel rendering for each tile.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

Also shown in FIG. 1B are an audio block 108 that may be coupled to the audio interface I/F 142, a memory stick 110 that may be coupled to the memory stick I/F 144, an SD card block 112 that may be coupled to the SDIO IF 146, and a debug block 114 that may be coupled to the JTAG I/F 148. The PAL/NTSC/high definition multimedia interface (HDMI) TV output I/F 150 may be utilized for communication with a TV, and the USB 1.1, or other variant thereof, slave port I/F 152 may be utilized for communications with a PC, for example. A crystal oscillator (XTAL) 107 may be coupled to the PLL 109. Moreover, cameras 120 and/or 122 may be coupled to the camera I/F 154.

Moreover, FIG. 1B shows a baseband processing block 126 that may be coupled to the host interface 129, a radio frequency (RF) processing block 130 coupled to the baseband processing block 126 and an antenna 132, a baseband flash 124 that may be coupled to the host interface 129, and a keypad 128 coupled to the baseband processing block 126. A main LCD 134 may be coupled to the mobile multimedia processor 102 via the display controller 162 and/or via the second external memory interface 160, for example, and a subsidiary LCD 136 may also be coupled to the mobile multimedia processor 102 via the second external memory interface 160, for example. Moreover, an optional flash memory 138 and/or an SDRAM 140 may be coupled to the external memory I/F 158.

In operation, the mobile multimedia processor (MMP) 102 may be adapted to generate 3D graphics images using Open GL and/or OpenVG software, for example. The mobile multimedia processor 102 may be adapted to perform tile mode graphics rendering in two separate phases. A first phase may comprise a binning process or operation and a second phase may comprise a rendering process or operation. During the first or binning phase, it may be determined which pixel tiles in a screen plane are covered or overlapped by each graphic primitive associated with a video frame, for example. During this phase, an ordered list of primitives and/or state-change data for each tile may be built. A coordinate shader may be utilized to perform at least some of the operations associated with the binning phase. The list or lists generated during the binning phase may comprise indices (e.g., vertex indices) that make reference to a table that comprises attributes of the vertices of the primitives. In some embodiments of the invention, the indices in the list or lists may be compressed. During the second or rendering phase, the contents associated with each pixel tile may be drawn or rendered. The rendering phase may utilize the list or lists generated during the binning phase that provide a reference to the vertex attributes of the primitives located within the tile. The vertex attributes may be brought into local memory on a tile-by-tile basis, for example. A vertex shader may be utilized to perform at least some of the operations of the rendering phase. Once a pixel tile is rendered, the rendered pixels may be pushed to main memory, for example, and a similar approach may be followed with other pixel tiles.

Control lists may be utilized to control the tile binning phase and the tile rendering phase. The control lists may comprise instructions for performing the two phases of tile mode graphics rendering and may comprise information for configuration of the 3D pipeline 103d. In addition, the control lists may comprise 3D graphics data and/or pointers to 3D graphics data. For example, during the tile rendering phase, the control lists may comprise the tile lists and/or may comprise links that may branch to tile lists. The tile lists may be utilized to reference vertex attributes for the primitives located within a tile. The vertex attributes may be utilized to render pixels for a tile. In various embodiments of the invention, once the tile is rendered, the rendered pixels may be stored in main memory, for example, the in the on-chip RAM 104 and/or the SDRAM 140.

Figure 2:
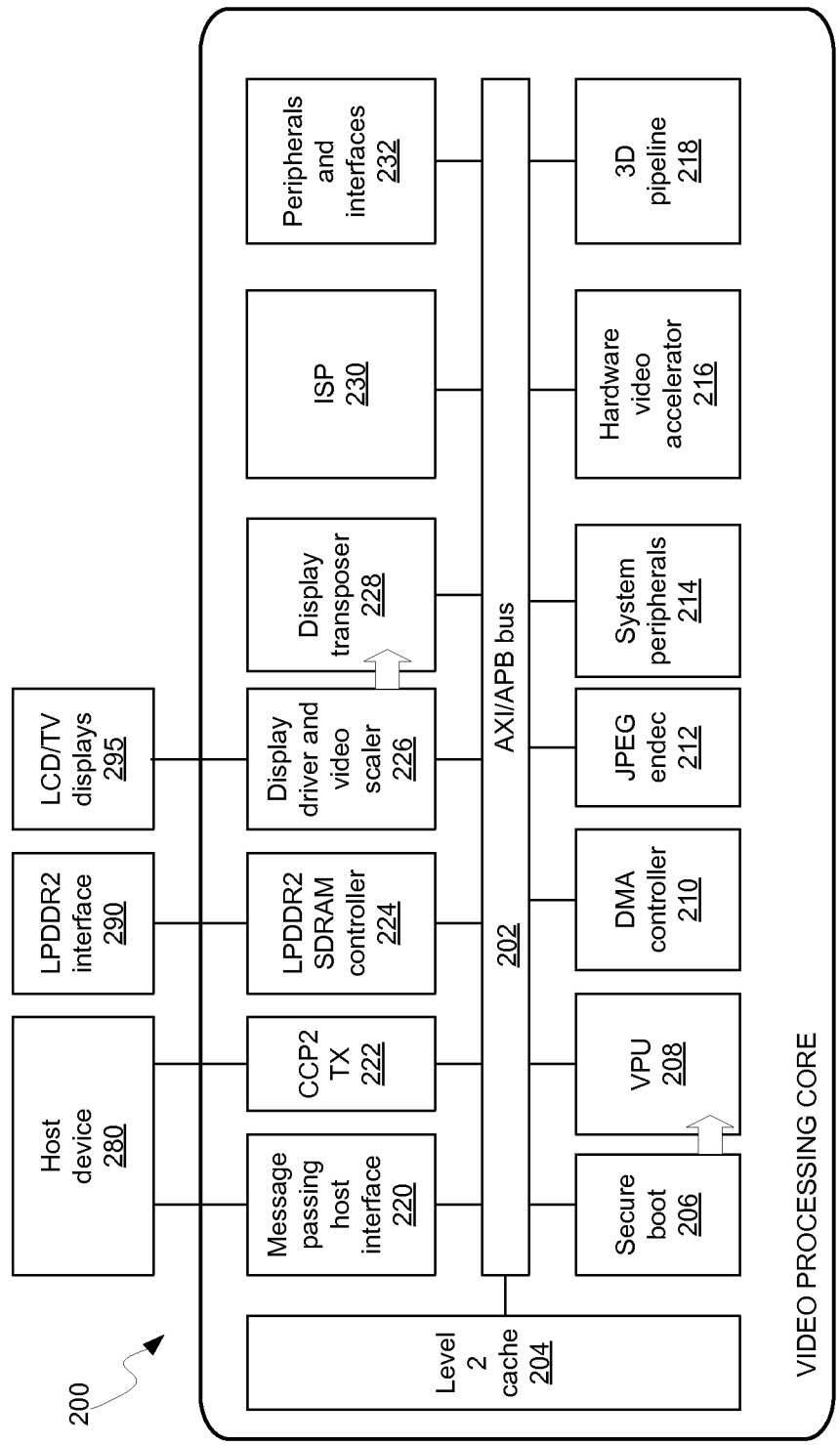
FIG. 2 is a block diagram that illustrates an exemplary video processing core architecture that is operable to generate control lists comprising control information and graphics data information, in accordance with an embodiment of the invention.

FIG. 2 is a block diagram that illustrates an exemplary video processing core architecture that is configured to generate control lists comprising control information and graphics data information, in accordance with an embodiment of the invention. Referring to FIG. 2, there is shown a video processing core 200 comprising suitable logic, circuitry, interfaces and/or code that may be operable to perform high performance video and multimedia processing. The architecture of the video processing core 200 may be configured to provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The architecture of the video processing core 200 may be configured based on various applications, features and/or capabilities provide by a host device. For example, the video processing core 200 may be configured to support multiple capabilities, comprising image sensor processing, high rate (e.g., 30 frames-per-second) high definition (e.g., 1080p) video encoding and decoding, three-dimensional (3D) graphics, high speed Joint Photographic Experts Group (JPEG) encode and decode, audio codecs, image scaling, and/or liquid crystal display (LCD) and television (TV) outputs, for example.

In one exemplary embodiment of the invention, the video processing core 200 may comprise an Advanced eXtensible Interface/Advanced Peripheral (AXI/APB) bus 202, a level 2 cache 204, a secure boot 206, a Vector Processing Unit (VPU) 208, a direct memory access (DMA) controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 Synchronous Dynamic Random Access Memory (LPDDR2 SDRAM) controller 224, a display driver and video scaler 226, and a display transposer 228. The video processing core 200 may also comprise an image sensor pipeline (ISP) 230, a hardware video accelerator 216, a 3D pipeline 218, and peripherals and interfaces 232. In other embodiments of the video processing core 200, however, fewer or more components than those described above may be included.

In one embodiment of the invention, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F described above with respect to FIG. 1B.

Coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments of the invention, the host device 280 may correspond to the processor 101j described above with respect to FIG. 1A. The LPDDR2 interface 290 may comprise suitable logic, circuitry, interfaces and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments of the invention, the LCD/TV displays 295 may correspond to one or more of the TV 101h and the external LCD 101p described above with respect to FIG. 1A, and the main LCD 134 and the sub LCD 136 described above with respect to FIG. 1B.

The message passing host interface 220 and the CCP2 TX 222 may comprise suitable logic, circuitry, interfaces and/or code that may be operable to allow data and/or instructions to be communicated between the host device 280 and one or more components in the video processing core 200. The data communicated may comprise image and/or video data, for example. In this regard, the CCP2 TX 222 may be operable to communicate high speed differential signaling comprising data generated by the image sensor processor (ISP) 230 to the host device 280.

The LPDDR2 SDRAM controller 224 and the DMA controller 210 may comprise suitable logic, circuitry, interfaces and/or code that may be operable to control access to memory by one or more components and/or processing blocks in the video processing core 200.

The VPU 208 may comprise suitable logic, circuitry, interfaces and/or code that may be operable for data processing while maintaining high throughput and low power consumption. The VPU 208 may provide flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, interfaces and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. The flexibility of the ISP 230 enables information to be taken from anywhere in the hardware pipeline and processed using software. The resulting software processed data may then be inserted at any location into the ISP 230 for processing.

The hardware video accelerator 216 may comprise suitable logic, circuitry, interfaces and/or code that may enable hardware accelerated processing of video data in any one of a plurality of video formats such as H.264, Windows Media 8/9/10 (VC-1), MPEG-1, MPEG-2, and MPEG-4, for example. For H.264, for example, the hardware video accelerator 216 may encode at full high-definition (HD) 1080p at 30 fps. For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, interfaces and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1G rendered pixels-per-second with Gouraud shading and one bi-linear filtered texture, for example. The 3D pipeline 218 may support four times (4×) full-screen anti-aliasing at full pixel rate, for example.

The 3D pipeline 218 may comprise suitable logic, circuitry, interfaces and/or code that may be operable to control 3D pipeline 218 operations utilizing one or more control lists. For example, the control lists may define operations and primitive data for tile mode graphics rendering of the primitive data. The tile mode graphics rendering may comprise a tile binning phase which may be referred to as a binning phase, for example, and a tile rendering phase which may be referred to as a pixel rendering phase, for example. The control lists may be generated by a host processor outside of the 3D pipeline 218 and may be read into the 3D pipeline 218. The control lists may drive hardware within the 3D pipeline 218 in order to automate control of 3D pipeline 218 operations. The control lists may control all or a large portion of the operations of the 3D pipeline 218 such that little or no interaction by a host processor may be needed after the 3D pipeline 218 begins executing based on the control lists. The control lists may comprise register settings, commands and data or pointers to data that may be utilized for tile mode graphics rendering.

The JPEG endec 212 may comprise suitable logic, circuitry, interfaces and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, interfaces and/or code that may be operable to drive the TV and/or LCD displays in the TV/LCD displays 295. Although an LCD display is shown in FIG. 2, the invention is not so limited and may comprise any suitable display type. For example, an LED display and/or a plasma display may be utilized. The display driver and video scaler 226 may output to the TV and LCD displays concurrently and in real time, for example. Moreover, the display driver and video scaler 226 may comprise suitable logic, circuitry, interfaces and/or code that may be operable to scale, transform, and/or compose multiple images. The display driver and video scaler 226 may support displays of up to full HD 1080p at 60 fps.

The display transposer 228 may comprise suitable logic, circuitry, interfaces and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, interfaces and/or code that may be operable to provide security and Digital Rights Management (DRM) support. The secure boot 206 may comprise a boot Read Only Memory (ROM)) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, interfaces and/or interface that may be operable to provide data and/or signal transfer between various components of the video processing core 200. In the example shown in FIG. 2, the AXI/APB bus 202 may be operable to provide communication between one or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example. The AXI/APB bus 202 may provide a high performance system interconnect that allows the VPU 208 and other components of the video processing core 200 to communicate efficiently with each other and with external memory.

The level 2 cache 204 may comprise suitable logic, circuitry, interfaces and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static Random Access Memory (SRAM)) of 32 kilobytes each.

The system peripherals 214 may comprise suitable logic, circuitry, interfaces and/or code that may be operable to support applications such as, for example, audio, image, and/or video applications. In one embodiment of the invention, the system peripherals 214 may be operable to generate a random or pseudo-random number, for example. The capabilities and/or operations provided by the peripherals and interfaces 232 may be device or application specific.

In operation, the video processing core 200 may be operable to carry out a plurality of multimedia tasks simultaneously without degrading individual function performance. Furthermore, with regard to graphics rendering, the 3D pipeline may render graphics primitive data on a tile basis in a two phase process, for example, in a tile binning phase and a tile rendering phase. Various aspects of the invention may comprise managing control flow and/or data flow within the 3D pipeline 218 utilizing tagged records corresponding to one or more control lists.

In an exemplary embodiment of the invention, the video processing core 200 may be operable to implement movie playback operations. In this regard, the video processing core 200 may be operable to add 3D effects to video output, for example, to map video onto 3D surfaces or to mix 3D animation with the video. The 3D graphics may be rendered by the 3D pipeline 218 on a tile basis utilizing the control lists.

In another exemplary embodiment of the invention, the video processing core 200 may be utilized in a gaming device. In this regard, full 3D functionality may be utilized. The VPU 208 may execute a game engine and may supply polygons to the 3D pipeline, for example, enabling high quality self-hosted games. The polygons may be rendered utilizing control lists that may comprise instructions, configuration data and vertex data. The compressed control lists may be utilized during a tile binning phase and during a tile rendering phase.

In another embodiment of the invention, the video processing core 200 may be utilized for stills capture. In this regard, the ISP 230 and/or the JPEG endec 212 may be utilized to capture and encode a still image. For stills viewing and/or editing, the JPEG endec 212 may be utilized to decode the stills data and the video scaler may be utilized for display formatting. Moreover, the 3D pipeline may utilize compressed tile lists to render 3D effects, for example, for warping an image or for page turning transitions in a slide show, for example.

Figure 3:
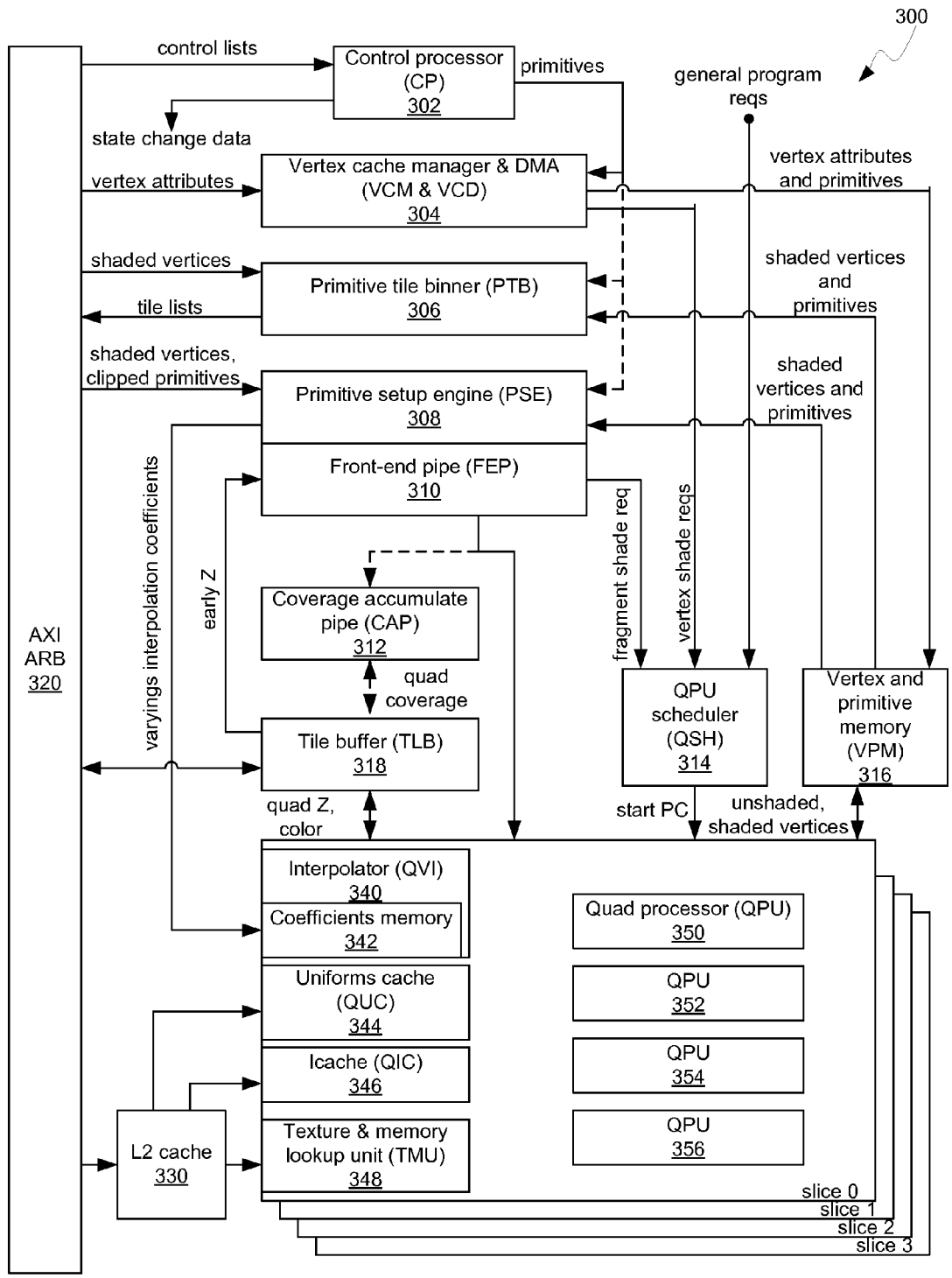
FIG. 3 is a block diagram that illustrates an exemplary 3D pipeline architecture that is operable to manage control flow and/or data flow utilizing tagged records in one or more control lists, in accordance with an embodiment of the invention

FIG. 3 is a block diagram that illustrates an exemplary 3D pipeline architecture that is operable to manage control flow and/or data flow utilizing tagged records in one or more control lists, in accordance with an embodiment of the invention. Referring to FIG. 3, there is shown, a 3D pipeline 300 that may comprise a control processor 302, a vertex cache manager and DMA 304, a primitive tile binner 306, a primitive setup engine 308, a front-end pipe 310, a coverage accumulate pipe 312, a QPU scheduler 314, a vertex and primitive memory 316, a tile buffer 318, a bus arbiter 320, a cache 330, an interpolator 340, a coefficients memory 342, a uniforms cache 344, an instruction cache 346, a texture and memory lookup unit 348 and a plurality of quad processor units 350, 352, 354 and 356.

The 3D pipeline 300 may be similar and/or substantially the same as the 3D pipeline 218 described with respect to FIG. 2 and/or may be implemented within the mobile multimedia system 105, for example. The 3D pipeline may comprise a scalable architecture and may comprise a plurality of floating-point shading processors, for example, the quad processor units (QPU) 350, 352, 354 and 356. In various embodiments of the invention, the 3D pipeline 300 may be operable to support OpenGL-ES and/or OpenVG applications. Moreover, the 3D pipeline 300 may be utilized in a wide variety of SoC devices, for example, a gaming device. The 3D pipeline 300 may comprise suitable logic, circuitry, interfaces and/or code that may be operable to perform tile-based graphics rendering in two phases. For example, a frame or screen may be divided into a plurality of areas referred to as tiles and each tile may be rendered in two phases. The 3D pipeline may perform a tile binning phase which may comprise coordinate shading and a tile rendering phase which may be referred to as a pixel rendering phase. Tile based graphics rendering may enable improvements in memory bandwidth and processing performance over frame based graphics rendering.

The 3D pipeline 300 may be operable to read batches of primitive data and/or corresponding control data from system memory. The 3D pipeline 300 may be operable to parse the batches of data and generate control lists for rendering the data for each tile. The control lists may comprise information regarding graphics primitives within each tile which may be referred to as "primitive data" and/or as "primitive's vertex data" and/or as "data". For example, the data may comprise color, texture, position and/or view information for the vertices of each primitive. The data may be stored within the control lists and/or at another location which may be referenced directly and/or indirectly by an index and/or a pointer within the control lists. For example, the control lists may comprise compressed indices for each primitive vertex that may point directly and/or indirectly to vertex data and/or may comprise compressed x,y coordinates. The control lists may also comprise control information which may be referred to as "control data." The control data may enable rendering of the primitive data. For example, the control data may comprise register settings and/or commands for binning and/or rendering the primitive data.

The quad processors (QPU) 350, 352, 354 and 356 may comprise suitable logic, circuitry, interfaces and/or code that may be operable to perform tile based vertex and fragment shading. The QPUs 350, 352, 354 and/or 356 may comprise multiple instances of a special purpose floating-point shader processor. In various embodiments of the invention, each of QPUs 350, 352, 354 and/or 356 may comprise a 16-way single instruction multiple data (SIMD) processor that may be operable to process streams of quads of pixels, however, the invention is not limited in this regard. The QPUs may be organized into groups of 4, for example, that may be referred to as slices. The QPUs 350, 352, 354 and/or 356 may share various common resources. For example, the slices may share the instruction cache (QIC) 346, one or two texture and memory lookup units (TMU) 348, the uniforms cache 344, the coefficients memory 342 and/or the interpolator (QVI) 340. The QPUs 350, 352, 354 and 356 may be closely coupled to 3D hardware for fragment or pixel shading and may utilize signaling instructions and dedicated internal registers. The QPUs 350, 352, 354 and 356 may perform fragment shading, in parallel, on successive batches of pixels. The QPUs may also perform vertex shading, in parallel, on successive batches of vertices.

The QPUs 350, 352, 354 and 356 may also support a plurality of hardware threads with cooperative thread switching that may hide texture lookup latency during 3D fragment shading.

The QPUs 350, 352, 354 and/or 356 may be operable to perform various aspects of interpolating vertices in modified primitives, for example, in clipped primitives. The interpolated vertices may be referred to as varyings. In this regard, blend functions and/or various aspects of interpolation of varyings may be performed in software.

The vertex cache manager and vertex direct memory access (VCM and VCD) 304 may comprise suitable logic, circuitry, interfaces and/or code that may be operable to collect batches of vertex attributes and may place them into the vertex and primitive memory (VPM) 316. Each batch of vertices may be shaded by one of the QPUs 350, 352, 354 and/or 356 and the results may be stored back into the VPM 316.

The primitive setup engine (PSE) 308 may comprise suitable logic, circuitry, interfaces and/or code that may be operable to fetch shaded vertex data from the VPM 316. Moreover, the PSE 308 may be operable to calculate setup data for rasterizing primitives and coefficients of various equations for interpolating the varyings. In this regard, rasterization setup parameters and Z and W interpolation coefficients may be fed to the front end pipeline (FEP) 310. The varyings interpolation coefficients may be stored directly to a memory within ones of the QPUs 350, 352, 354 and/or 356 slices for just-in-time interpolation.

The front end pipeline (FEP) 310 may comprise suitable logic, circuitry, interfaces and/or code that may be operable to perform rasterization, Z interpolation, Early-Z test, W interpolation and W reciprocal functions. Groups of pixels output by the FEP 310 may be stored into registers mapped into QPUs which are scheduled to carry out fragment shading for that group of pixels.

There is nominally one texture and memory lookup unit (TMU) per slice, but texturing performance may be scaled by adding TMUs. Since multiple slices are utilized, a same texture may appear in more than one TMU. To avoid memory bandwidth and cache memory wastage with common textures, there is a L2 texture cache (TL2), and each TMU may have only a small internal cache.

The AXI/APB bus 320 may be similar and/or substantially the same as the AXI/APB bus 229 described with respect to FIG. 2.

Each of the QPUs 350, 352, 354 and/or 356 may share one or more of the texture and memory look up units (TMU) 348 and may share the TL2 cache 330. The TMUs 348 may comprise suitable logic, circuitry, interfaces and/or code that may be operable to perform general purpose data lookups from memory and/or for filtered texture lookups. Alternatively, the VCD 304 may be operable perform direct memory access of data going into or out of the VPM 316 where it may be accessed by the QPUs 350, 352, 354 and/or 356.

The coverage accumulation pipeline (CAP) 312 may comprise suitable logic, circuitry, interfaces and/or code that may be operable to perform OpenVG coverage rendering, for example. In this regard, the QPUs 350, 352, 354 and/or 356 may be bypassed.

The QPUs 350, 352, 354 and/or 356 and/or the CAP 312 may output pixel data to the tile buffer (TLB) 318. In various embodiments of the invention, the TLB 318 may be configured to handle 64×64 samples and/or may support 32×32 pixel tiles. In other embodiments of the invention, TLB 318 may handle 64×64 pixel tiles in non-multi-sample and/or OpenVG 16× coverage modes. The TLB may also be configured to handle 64×32 samples with 64-bit floating-point color for HDR rendering, for example. The TLB 318 may be operable to write decimated color data to a main memory frame buffer when rendering of a tile is complete. The TLB 318 may store and/or reload the tile data to and/or from memory using data compression.

In operation, the 3D pipeline 300 may utilize control lists to control guide and/or coordinate a plurality of data and/or processes for rendering graphics primitives. The control lists may comprise primitives and/or vertex data and control data. The control data may be referred to as state data. The control processor (CP) 302 may be operable to parse and/or interpret the control lists and may feed the 3D pipeline 300 with the primitive data and/or control data. In various embodiments of the invention, controlling operations and/or data flow in the 3D pipeline 300 by stepping through the control lists and acting in accordance with information and data within the control-lists, rendering of pixels may be enabled without use of a driver.

The 3D pipeline 300 may perform tile-based graphics rendering in a plurality of phases, for example, a tile binning phase and a tile rendering phase. The tile rendering phase may be referred to as a pixel rendering phase. During the tile binning phase, only a vertex coordinate transform portion of a full vertex shading process may be performed. Moreover, during the tile binning phase, the CP 302 may fetch primitive data. The VCD 304 may fetch vertex data from vertex attribute arrays and may cache the vertex data in the VPM 316 in batches for use in coordinate shading which may be performed by the QPUs 350, 352, 354 and/or 356, for example. In various embodiments of the invention, for 2D (OpenVG) graphics, the primitive data may comprise "screen space" coordinates of the vertices and a separate vertex fetch operation may not be required. During coordinate shading, input vertex data that may be represented in "model space" coordinates, may be transformed to "screen space" coordinates. In instances when the fetched vertex data already comprises "screen space" coordinates, for example, in 2D OpenVG graphics, the coordinate shading process may not be performed. Once the "screen space" coordinates are determined, the PTB 306 may perform primitive tile binning. In this regard, the PTB 306 may determine which tiles are overlapped by a primitive that is represented in "screen space" coordinates and may write the primitive and/or any appropriate control data, to a tile list corresponding to each overlapped tile. In this regard, an output of the tile binning phase comprises a tile list and/or control list for each tile. A tile list may comprise information regarding primitives which overlap the tile and/or may comprise control data and/or state changes that may apply. For example, a tile list may comprise indices that may point to stored vertex attributes for vertices of the primitives overlapping the tile. In various embodiments of the invention, the tile list comprising the indices may be compressed.

In various exemplary embodiments of the invention, the 3D pipeline 300 may be operable to clip primitives, for example, clip triangles that may extend beyond a tile or beyond a viewport. Clipped primitives may be divided into a plurality of new triangles. Vertices for the new triangles, which may be referred to as varyings, may be interpolated. In this regard, the PSE 308 may store varying interpolation coefficients in QPU memory, for example, into each QPU 350, 352, 354 and/or 356 memory simultaneously. In an exemplary embodiment of the invention, dedicated hardware may be utilized to partially interpolate the varyings and the remaining part of the interpolation may be performed utilizing software that is executed by one or more of the QPUs 350, 352, 354 and/or 356.

During the tile rendering phase, the 3D pipeline 300 may utilize tile lists created during the tile binning phase to perform tile based rendering of primitives. The 3D pipeline 300 may output rendered pixel information. During the tile rendering phase, primitives may be fetched by the QPUs 350, 352, 354 and/or 356 from the tile lists and may perform full vertex shading. In this regard, tile mode coordinate shading may again be performed to transform model space coordinates to "screen space coordinates." In addition, other vertex parameters such as, for example, texture coordinates, vertex normals and/or color shading values may be processed. The PSE 308 and/or the FEP 310 may perform primitive rasterization where a set of pixels occupied by a primitive in a specified tile may be determined. Furthermore, the QPUs 350, 352, 354 and/or 356 may perform pixel shading which may be referred to as fragment shading. In this regard, the QPUs 350, 352, 354 and/or 356 may determine color and/or depth of each pixel in the tile and may write the pixel data to the TLB 318. The pixel shading may also comprise texture look-ups by the TMU 348 and/or varyings interpolation by the QVI 340. In various exemplary embodiments of the invention, for 2D pixel rendering, the CAP 312 may be utilized instead of the QPUs for a coverage generation stage during the first part of pixel rendering. Output from the tile rendering phase may comprise pixel color data for each tile in the TLB 318 which may be written in an appropriate place of an output image.

Figure 4A:
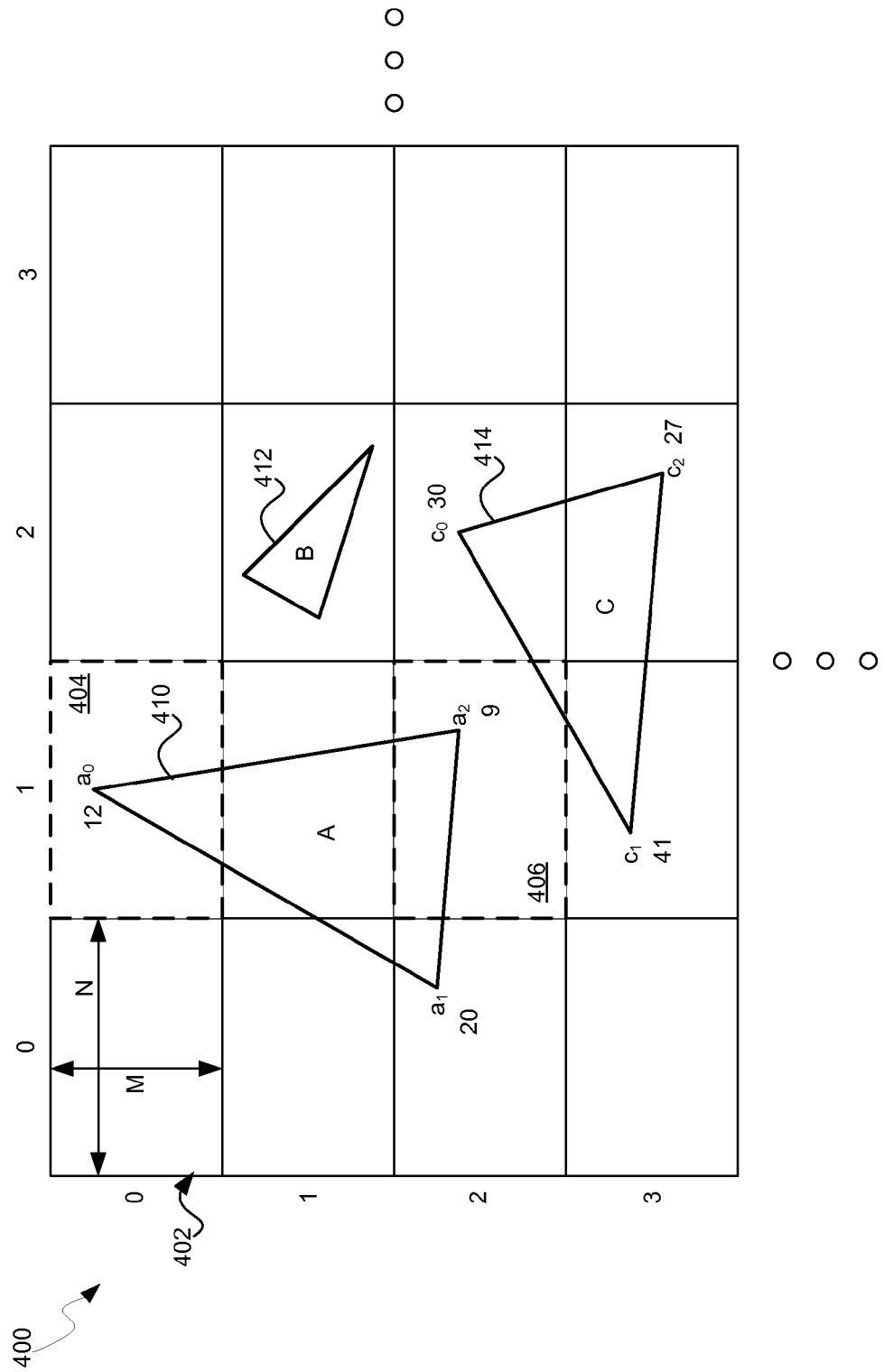
FIG. 4A is a block diagram that illustrates exemplary graphics primitives transformed into a tiled view-space, in accordance with an embodiment of the invention.

FIG. 4A is a block diagram that illustrates exemplary graphics primitives transformed into a tiled view-space, in accordance with an embodiment of the invention. Referring to FIG. 4A, there is shown, a tiled view-space frame 400, a plurality of tiles 402, a tile 404, a tile 406 and a plurality of triangles comprising a triangle a 410, a triangle B 412, and a triangle C 414. The triangle A 410, the triangle B 412, and/or the triangle C 414 may be referred to as the triangles 410, 412 and/or 414.

The tiled view-space frame 400 may be divided into a plurality of tiles 402. The tiles may be identified according to their position, for example, the tile 404 may be identified as tile (1, 0) and the tile 406 may be identified as the tile (1, 2). In an exemplary embodiment of the invention, each of the plurality of tiles 402 may comprise a 32×32 block of pixel information, although the invention is not limited in this regard. Graphics primitives may be positioned within the tiled view-space frame 400, for example, the triangles 410, 412 and/or 414 may be placed within the tiled view-space frame 400. Other types of primitives may be utilized, for example, lines, points and/or RHTs. The graphics primitives, for example, the triangles 410, 412 and/or 414 may overlap one or more of the tiles 402. The graphics primitives may be represented in the tiled view-space 400 according to view-space coordinates of their vertices. The graphics primitives and/or their vertices may define one or more of an image, an object and/or a surface, for example. In this regard, the view-space coordinates may indicate a rendered object's position on a video screen.

In operation, graphics primitives, for example, the triangles 410, 412 and/or 414, may be positioned in the tiled view-space frame 400 during the tile binning phase and/or during the tile rendering phase of pixel rendering. Prior to representation in the tiled view-space frame 400, the graphics primitives, for example, the triangles 410, 412 and/or 414, may be generated and/or represented in a model space by graphics software. For example, code compliant with OpenGL and/or variations and/or extensions thereof such as OpenGL-ES may be utilized to generate the graphics primitives in the modeling space. A table of vertices generated by the OpenGL software may comprise a listing of the vertex information and/or vertex attributes of the primitives. The OpenGL table comprising a listing of the vertices may be stored in main memory, for example, the on-chip RAM 104 and/or the SDRAM 140. In addition, a list of uncompressed indices, which reference vertices stored within the OpenGL generated table of vertices, may also be stored in the main memory, for example, in the on-chip RAM 104 and/or the SDRAM 140 described with respect to FIG. 2.

In an exemplary embodiment of the invention, one uncompressed index that may reference one vertex may comprise 32 bits. The model space primitives may be arbitrarily positioned within the modeling space. The 3D pipeline 300 may read vertex information for the graphics primitives represented in modeling space and may apply various transforms that may place the primitives, for example, the triangles 410, 412 and/or 414 at certain coordinates within the tiled view-space frame 400. In this regard, a transformation may place the primitives at the certain coordinates within the tiled view-space frame 400 and another transformation may rotate the primitives according to a field of view. Coordinates for vertices of the graphics primitives in view-space may be determined by the 3D pipeline 300. For example, one or more of the QPUs 350, 352, 354 and/or 356 may be operable to determine the coordinates for the triangles 410, 412 and/or 414 within the tiled view-space frame 400. The transformations may be implemented by matrix multiplication of modeling space coordinates and position and view information received from the OpenGL graphics software, for example.

FIG. 4B is a block diagram that illustrates exemplary vertex information that may be utilized during a tile binning phase and/or during a tile rendering phase, in accordance with an embodiment of the invention. Referring to FIG. 4B, there is shown, a table of vertices 450 and a plurality of indexed vertex records 452, 454, 456, 458, 460 and 462.

The table of vertices 450 may be stored in main memory, for example, the on-chip RAM 104 and/or the SDRAM 140 and may comprise vertex information for the triangles 410, 412 and/or 414. The indexed vertex records 452, 454, 456, 458, 460 and 462 may comprise information utilized for tile mode binning and/or tile mode rendering of the triangles 410, 412 and/or 414. The vertex information may also be utilized for interpolating vertices, for example, vertices interpolated for a clipped primitive. U.S. patent application Ser. No. 61/311,640filed on Mar. 8, 2010 and incorporated herein in its entirety comprises additional information regarding clipped primitives and interpolating vertices for clipped primitives.

In an exemplary embodiment of the invention, the indexed vertex records 452, 454 and 456 may be associated with the indices 9, 12 and 20 and may each comprise information regarding a vertex of the triangle A 410. The indices 9, 12 and 20 may be encoded and/or compressed in each tile list that comprises the triangle A 410 during the tile binning phase and may be utilized to retrieve vertex information during the tile rendering phase. The vertex information may be referred to as vertex attributes. Information stored within each of the indexed vertex records 452, 454, 456, 458, 460 and 462 may comprise modeling space coordinates for a vertex and/or information that may enable transformation of the vertex to a location and/or a field of view within a view-space, for example, within the tiled view-space frame 400. Moreover, information or attributes stored within the indexed vertex records 452, 454, 456, 458, 460 and 462 may comprise lighting, texture, color and/or other information that may be utilized for full vertex shading.

The table of vertices 450 may be stored in main memory and the indexed vertex information needed for rendering of a particular tile may be read into local memory based on the compressed tile list during rendering of the tile. Once pixels for a tile are rendered, the pixel data may be stored in main memory.

In operation, control lists may be utilized to render the triangles 410, 412 and/or 414. The rendering may comprise a tile binning phase and a tile rendering phase. The triangles 410, 412 and/or 414 may be rendered based on information describing their vertices and/or any interpolated vertices. In this regard, steps performed during the tile binning phase may comprise a subset of the steps performed during the rendering phase. For example, during the tile binning phase, primitives may be transformed into view-space and corresponding view-space coordinates, for vertices of the primitives, may be determined. As such, the binning phase may be referred to as coordinate shading phase. Primitives that overlap a tile may be identified. For example, the tile (1, 0) 404 may be overlapped by the triangle A 410. The tile (2, 1) 406 may be overlapped by the triangle A 410 and the triangle C 414. Vertex information and/or vertex attributes may be stored in indexed records within the table of vertices 450. For each tile 402, a tile list may be generated during the tile binning phase that may comprise compressed indices that may be utilized to index vertices within the table of vertices 450. For example, a tile list for the tile (1, 0) 404 may comprise compressed indices that point directly or indirectly to records for vertices of the triangle A 410. A tile list for the tile (1, 2) 404 may comprise compressed indices that point directly or indirectly to records for the vertices of the triangle C 414.

Control lists may be utilized for tile binning and/or for tile rendering. In various embodiments of the invention, a plurality of tiles may be rendered in parallel, for example, by a plurality of QPUs such as the QPUs 350, 352, 354 and/or 356. The control lists may comprise control information such as processing instructions and/or state information. In addition, the control lists may comprise primitive data and/or pointers to the primitive data, for example, the control lists may comprise the tile lists. Primitives may be rendered by stepping through the control lists and utilizing the state information and/or the instructions therein to configure the 3D pipeline 300 and to manage the flow of data. Data may be moved to appropriate modules within the 3D pipeline 300 and may be processed in accordance with the processing instructions in the control list, as described with respect to FIG. 5.

For the tile rendering phase, the tile lists that are generated during the tile binning phase may be embedded within a control list. Furthermore, the tile lists may be pointed to from the control list for the purpose of branching from the control list to one or more tile lists during rendering. A plurality of tile lists may be daisy chained and processed in sequence and/or a tile list may link directly or indirectly back to the control list.

FIG. 4C is a block diagram that illustrates exemplary index information that may be encoded during a tile binning phase of tile mode graphics rendering, in accordance with an embodiment of the invention. Referring to the FIG. 4C, there is shown a tile list 430 comprising tile records 432 and 434.

The tile list 430 may generated during the tile binning phase of tile mode graphics rendering. The tile list 430 may be embedded in-line within a control list or may be linked to from the control list. The tile list 430 may be generated based on determined vertex coordinates of the triangles 410, 412 and/or 414 in the tiled view-space frame 400. For example, the vertex cache manager and DMA (VCM & VCD) may collect vertex attributes and place them into the vertex and primitive memory (VPM) 316. The primitive tile binner (PTB) 306 may fetch transformed vertex coordinates and/or primitives from the vertex and primitive memory (VPM) 316 and may generate the tile list 430 that may comprise compressed indices. In this regard, each tile within the plurality of tiles 402 may be associated with a record in the tile list 430, for example, the records 432 and 434. In an exemplary embodiment of the invention, the record 432 may comprise an identity of the tile (1, 0) 404 and/or an identity of the triangle A 410. In addition, the record 432 may comprise one or more compressed indices that may point directly or indirectly to one or more records comprising vertex information for the triangle A 410, for example, the indices 12, 20, 9 may be compressed. Similarly, the record 434 may comprise an identity of the tile (1, 2) 406 and/or an identity of the triangle A 410 and the triangle C 414. In addition, the record 434 may comprise compressed indices that reference one or more records in the table of vertices 450 which comprise vertex information for the triangle A 410 and the triangle C 414, for example, one or more of the compressed indices 12, 20, 9 and the indices 30, 27 and 41.

In operation, information in the tile list 430 may be utilized by a control list for controlling tile mode graphics rendering by the 3D pipeline 300. For example, primitives may be rendered on a tile basis based on contents of the tile lists. In this regard, during a binning phase, compressed indices corresponding to records of the table of vertices 450 may be stored in the tile list 430. Also, other information within the tile list 430 may be compressed. For example, the compressed indices stored in the tile list 430 may be differentially encoded by indicating a difference in adjacent or nearby index values rather than storing absolute index values. Absolute index values may comprise a large number of bits, for example, 32 bits and differential encoding of the indices may significantly reduce memory bandwidth for storing tile lists as well as improving cache access time. Moreover, in instances when one or more of the vertices are shared by a plurality of joined primitives, for example, when two triangles share two vertices, shared indices may not be repeated in a tile list. Once an index is listed for one vertex and/or for one primitive, indices listed for another joined primitive may only comprise indices for vertices that have not been previously encoded in the tile list. Additional information regarding how the primitives are joined may also be encoded in the tile list. For example, triangles may be joined in a fan or strip pattern. Furthermore, a sequence of fans and/or strips may be joined. In various embodiments of the invention, a compressed sequence of indices may be represented in the tile list 430 by one number. Exemplary joined primitives which may comprise a triangle strip and a triangle fan, for example are described in U.S. patent application Ser. No. 61/311,640. In contrast, OpenGL software output may comprise a 32 bit index for each vertex in each joined primitive.

In various embodiments of the invention, the view-space coordinates that are determined during the binning phase may be discarded once the tile lists are generated. The view-space coordinates may be generated again during the rendering phase. In this manner, memory may be conserved.

Compressed tile lists may be listed inline within a control list which may be utilized for controlling the 3D pipeline 300 or the tile lists may comprise a sub-list that may be linked to and/or from the control lists, for example. In this regard, the control lists may comprise records of primitive information in the tile lists and/or may comprise control information. Each primitive within the tile list may be encoded in a variable number of bytes, for example. The compressed tile lists may be terminated with an escape code. The compressed lists may also comprise embedded branch records. The embedded branches may enable the list to comprise multiple chained memory blocks. The multiple memory blocks may be processed without escaping from and restarting, processing of the control lists.

Indices generated by OpenGL software may be represented by 32 bit numbers. Accordingly, three vertices of a triangle may be indexed by OpenGL software with three uncompressed 32 bit numbers.

Figure 5:
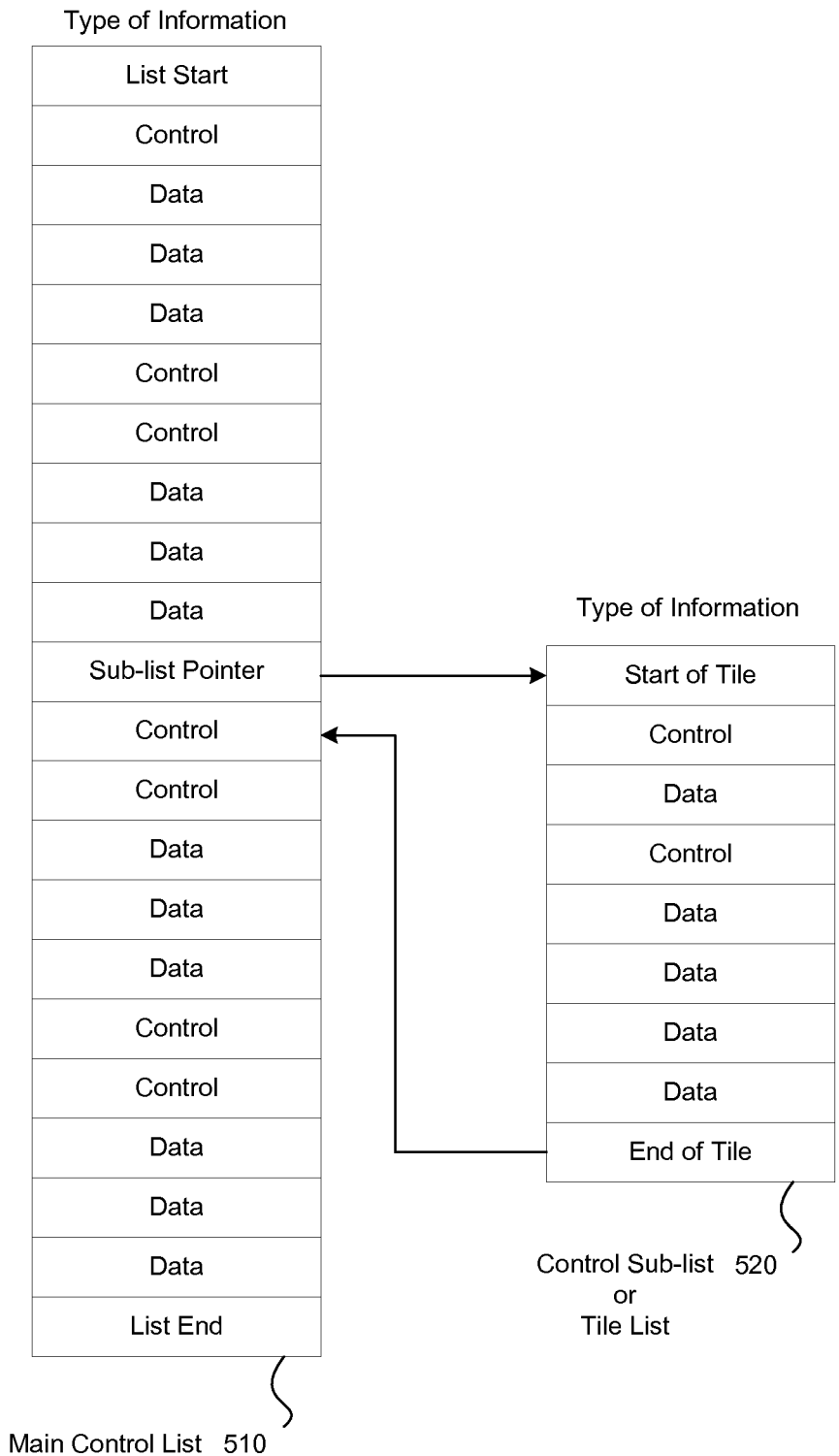
FIG. 5 is a block diagram that illustrates an exemplary control list and control sub-list that may be utilized to manage 3D pipeline processing, in accordance with an embodiment of the invention.

FIG. 5 is a block diagram that illustrates an exemplary control list and control sub-list that may be utilized to manage 3D pipeline processing, in accordance with an embodiment of the invention. Referring to FIG. 5, there is shown a main control list 510 and a control sub-list 520.

The main control list 510 and/or the control sub-list 520 may comprise primitive data in line in the control list and/or may comprise pointers to memory structures comprising the data that may be processed by the 3D pipeline 300. For example, the main control list 510 and/or the control sub-list 520 may comprise primitive data and/or direct and/or indirect pointers and/or indices that reference storage locations comprising the data. The primitives may comprise triangles, lines and/or points, for example. The primitive data and/or the direct and/or indirect pointers and/or indices may be referred to as "data"

The main control list 510 and/or the control sub-list 520 may comprise in line control-data and/or a direct or indirect pointer to a memory structure comprising the control-data. For example, the control-data may comprise register settings and/or commands that may be utilized for configuring the 3D pipeline 300 and/or utilized for processing the primitive data. In addition, the main control list 510 and/or the control sub-list 520 may comprise state change information, for example, a record comprising a start of list indicator, an end of list indicator, a start of tile indicator and/or an end of tile list indicator, may initiate a change in state. Moreover, the main control list 510 and/or the control sub-list 520 may comprise one or more branches to a sub-list, for example, from the main control list 510 to the sub-list 520. In this manner, the main control list 510 and/or the control sub-list 520 may comprise both data to be processed and control-data that may specify and/or control how the data is processed by the 3D pipeline 300.

In various embodiments of the invention, the control processor (CP) 302 may be operable to utilize tags when controlling the 3D system with a control list which comprises interspersed control and primitive data. In this regard, the CP 302 may toggle binary tags, for example, when control items are encountered in a control list. The control items may be pushed into a FIFO rather than passed into the main pipeline between primitives. In this manner, control changes (from the control records) may be synchronized to the correct primitives at appropriate places downstream in the pipeline.

In an exemplary embodiment of the invention, control records may be fed through the main 3D pipeline 300, the same as primitives. A control record will then arrive at the point it needs to be applied in the correct sequence (just before the first primitives it applies to). In another exemplary embodiment of the invention, control records may be sent into control streams, for example, in a control FIFO that may be separate from the main primitive pipeline. A control data record and a corresponding primitive may be tagged with the same tag. The control data may then be applied at the appropriate time, downstream in the primitive pipeline, by reading control data from the control FIFO when a primitive data tag is encountered that differs from a current control data tag.

The 3D pipeline 300 may step or advance through the main control list 510 and/or the control sub-list 520 and may process the data in the list according to the control-data in the list. When a toggled tag bit is encountered, the 3D pipeline 300 may set registers and/or configure the pipeline for processing the new set of data and may feed the data into appropriate places in the pipeline for processing. In this manner, operations in the 3D pipeline 300 may be controlled by the main control list 510 and/or one or more control sub-lists such as the control sub-list 520. Once hardware in the 3D pipeline 300 begins reading the main control list 510, processing of the primitive data may proceed until an end of list is encountered with little or no interaction with a host processor.

A master list of data and/or of control-data for a video and/or graphics frame may be generated and/or stored outside of the 3D pipeline 300 utilizing Open GL and/or Open VG software, for example. During a tile binning or tile rendering phase of primitive rendering, the control processor (CP) 302 in the 3D pipeline 300 may fetch batches of the data and/or the control-data. The main control list 510 and/or a plurality of control sub-lists such as the control sub-list 520 may be generated based on the fetched data. In various embodiments of the invention, a control sub-list may be generated for each tile in the frame which may be referred to as tile lists. The main control list 510 may link to the tile lists and the tile lists may link back to the main control list 510. Moreover, in various embodiments, a plurality of tile lists may be chained. The CP 302 may fetch the batches of Open GL and/or Open VG data and may parse the primitive data and/or the control-data. The control-data may be categorized into different types and the different types may be pushed into different FIFOs. Primitive data may be put into different FIFOs from the control-data. In this manner, data flow and/or control flow may be coordinated and/or synchronized.

During a binning phase, screen space coordinates may be determined for the vertices of the fetched primitives, for example, triangles, and it may be determined in which tile each primitive is located. A main control list such as the main control list 510 may be generated and/or one or more tile lists such as the sub-list 520 may be generated for ones of tiles within a frame. The main control list 510 may link to each of the generated tile lists directly and/or may link through chaining of the tile lists and/or various control sub-lists, for example. For triangles and/or primitives located in a screen space tile, primitive data and/or pointers to the primitive data, as well as corresponding control-data and/or pointers to the control-data may be stored in the tile list. In various embodiments of the invention, once a main control list and a corresponding tile lists or sub-lists are generated for a frame during the binning phase, the "screen space" coordinates may be discarded. For example, the screen space coordinates may be generated again during the full vertex shading of the pixel rendering phase. In this manner, memory bandwidth may be conserved.

In operation, a master list of data and/or control-data for a video and/or graphics frame may be generated and/or stored outside of the 3D pipeline 300 utilizing Open GL and/or Open VG software. The control processor (CP) 302 in the 3D pipeline 300 may fetch batches of the data and/or control-data into local memory on the 3D pipeline 300. The control processor 302 may operate on a plurality of threads, for example, two threads of data and/or control-data. In this regard, the two threads may be referred to as two pipelines. One pipeline may handle the tile binning phase and another pipeline may handle the tile rendering phase. During the binning phase tile lists may be generated. During the rendering phase, pixels in screen space may be rendered with color, light and/or texture, for example. The vertex cache manager and vertex cache DMA (VCM and VCD) 304 may be operable to read indices for the vertex data of primitives and may be operable to retrieve vertex data pointed to by the indices from an array of vertices. The VCM and VCD 304 may store the vertex data in the vertex and primitive memory (VPM) 316. When vertices are stored within the VPM 316, coordinate shading, for example, the binning phase and/or full vertex shading, for example, the pixel rendering phase, may be launched.

Tile binning and/or tile rendering may be handled in a plurality of threads which may be referred to as pipelines. For example, two processing threads may perform the Tile binning and/or tile rendering. The two processing threads may be referred to as two pipelines. In various embodiments of the invention, tile rendering may be performed on one set of data concurrently with tile binning for another set of data. For example, when a set of data has been processed by a tile binning pipeline, that set of data may be processed by a tile rendering pipeline. Concurrent with the tile rendering, another set of data may be processed by the tile binning pipeline.

With regard to coordinate shading and/or tile binning, when a batch of data is loaded in the VPM 316, the quad processor scheduler (QPU scheduler) 314 may schedule one or more QPUs to process the data. Vertices represented in modeling space may be read from the VPM 316 and sent to one or more quad processors (QPU) 350, 352, 354 and/or 356, for example. The QPUs 350, 352, 354 and/or 356 may transform the modeling space coordinates to "screen space" coordinates and may store the results back to the VPM 316. Indices may be passed to the primitive tile binner (PTB) 306. The PTB 306 may fetch the shaded "screen space" coordinate data from the VPM 316 and may determine in which tile a primitive, for example, a triangle may be located. The PTB 306 may store indices for the primitive into an appropriate tile list. Moreover, control-data and/or pointers to control-data may be stored in appropriate tile lists that comprise primitive data corresponding to the control-data. The binning process may be repeated for a plurality of batches of data.

With regard to tile rendering or pixel rendering, tile lists that are generated during the tile binning phase may be sent to the primitive setup engine (PSE) 308. On a tile list basis, batches of primitive data, for example, in line data and/or indices referencing data may be read into the CP 302 and may be sent to the PSE 308. The PSE 308 may fetch vertex attributes and may render primitives, for example, triangles.

The PSE may determine equations for triangle edges that may be utilized for rasterization and/or may determine values, for example, coefficients for interpolating shading values. Output from the PSE 308 may be sent to the front end pipeline (FEP) 310. The FEP 310 may determine which pixels may be utilized for which triangles in the tile. Output from the FEP 310, for example, the pixel information and/or coefficients may be sent to one or more QPUs, for example, the QPUs 350, 352, 354 and/or 356 for pixel rendering and/or varyings interpolation, for example. The QPU scheduler 314 may keep track of which QPU and/or which slice is available and may schedule processing accordingly. The QPUs may be operable to output the results to the tile buffer (TLB) 318. For example, during the tile rendering phase, the TLB 318 may be utilized to buffer rendered pixels. A plurality of QPUs may share the TLB 318. A scoreboard system may be utilized to prevent multiple QPUs from accessing the same pixel samples at the same time and also to ensure that overlapping pixel samples are rendered in the correct order.

During tile rendering based on control lists, reaching an end of tile, state change record in a tile list may indicate that all pixels in a tile have been rendered. Once a tile has been rendered, contents of a color buffer in the TLB 318 may be written to a frame buffer in main memory, for example. When pixel data for each tile has been written out of the TLB 318, the TLB 318 may be reset or cleared in preparation for rendering the next tile.

Figure 6:
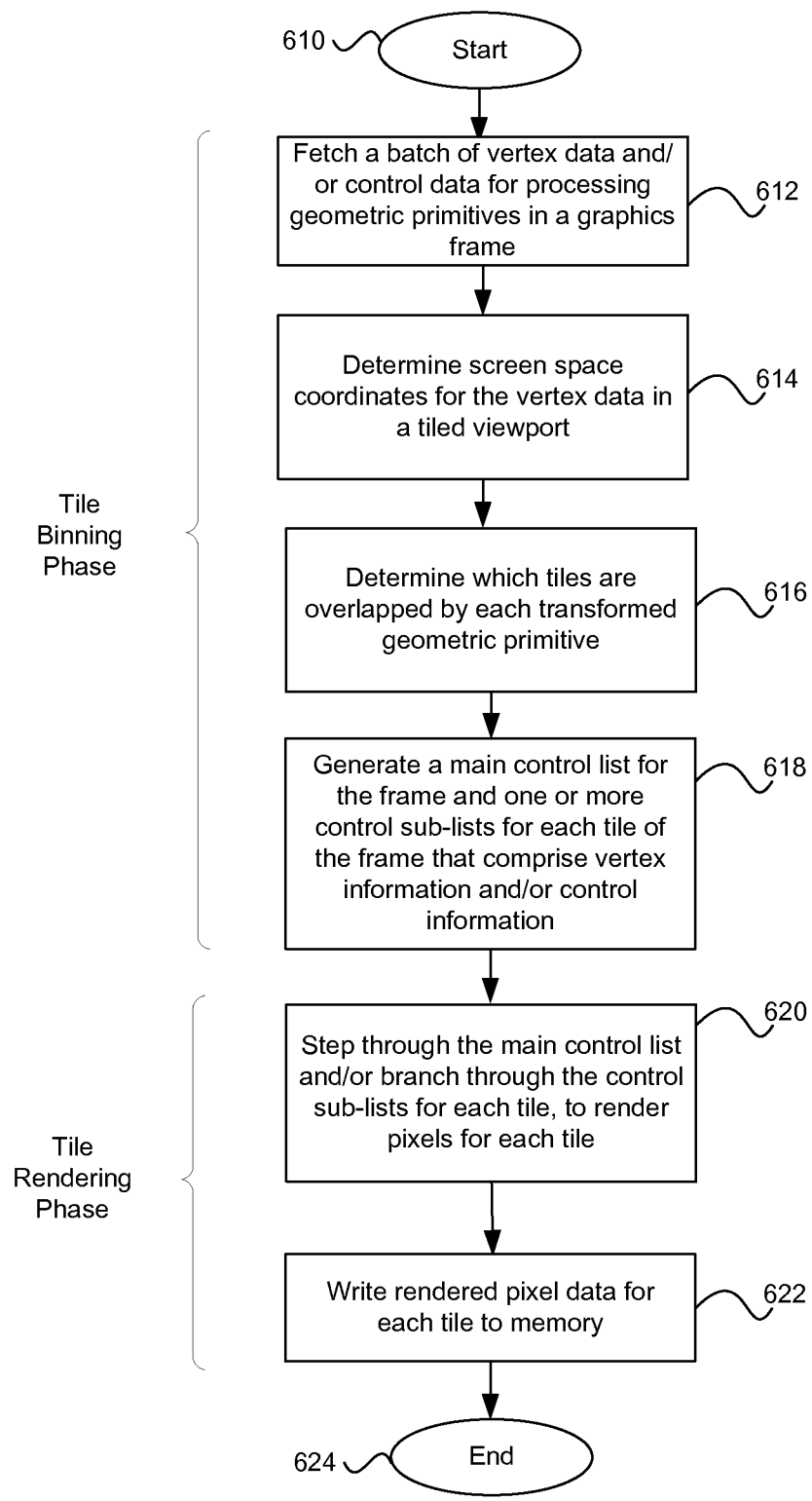
FIG. 6 is a flow chart illustrating exemplary steps for managing data flow and control flow utilizing control lists in a 3D pipeline, in accordance with an embodiment of the invention.

FIG. 6 is a flow chart illustrating exemplary steps for managing data flow and control flow utilizing control lists in a 3D pipeline, in accordance with an embodiment of the invention. The exemplary steps may begin at step 610. In step 612, a batch of vertex data and/or control data may be fetched by the control processor 302 for processing geometric primitives in a graphics frame, for example, the triangles 410, 412 and/or 414. In step 614, screen space coordinates may be determined for the vertex data in a tiled viewport, for example, within the tiled view-space frame 400 that comprises the plurality of tiles 402. In step 616, the primitive tile binner (PTB) 306 may determine which tiles are overlapped by which transformed geometric primitive. For example, tile 404 is overlapped by triangle 410 and tile 406 is overlapped by triangles 410 and 414. In step 618, a main control list may be generated for the frame, for example, for the tiled view-space frame 400. In addition, one or more control sub-lists may be generated for each tile of the frame that comprises vertex information and/or control information, for example, one or more tiles of the plurality of tiles 402. In step 620, the 3D pipeline 300 may step through the main control list 510 and/or branch through the control sub-lists, for example, the control sub-list 520. In this regard, the steps may branch through each tile list to render pixels for corresponding tiles. In step 622, rendered pixel data for the plurality of tiles 402 may be written to memory. The exemplary steps may end at step 624.

In an embodiment of the invention, one or more processors and/or circuits in a graphics processing device, or example, the 3D pipeline 300 may be operable to generate one or more control lists that may correspond to 3D graphics to be processed, for example, the main control list 510 and/or the control sub-list 520. Records within the one or more control lists may comprise primitive data for the 3D graphics and/or pointers to the primitive data. In addition, the records may comprise control data for processing the primitive data. Processing of the 3D graphics may be controlled utilizing the records within the generated control lists, example, the main control list 510 and/or the control sub-list 520 which may be referred to as a tile list.

The graphics processing device, for example, the 3D pipeline 300, may comprise one or more parallel processors that may process portions of the 3D graphics in parallel. The processing may be controlled utilizing one or more tags that may correspond to one or more of the records within the generated control lists 510 and/or 520. The primitive data may be processed in a tile mode. For example, the 3D graphics may be processed on a tile by tile basis, wherein a tile may comprise a portion of the 3D graphics and a 3D frame may comprise a plurality of the tiles. Furthermore, the 3D graphics may be processed utilizing a tile binning phase and/or a tile rendering phase. A tile binning phase for one portion of the 3D graphics may be performed in parallel with a tile rendering phase for another portion of the 3D graphics. One or more of the control lists may comprise a main control list 510 and/or one or more control sub-lists, for example, the control sub-list 520. One or more of the control lists may comprise a tile list. One or more of the control lists, for example, the main control list 520 may comprise one or more links to one or more other lists. Processing control may be advanced through one or more of the control lists 510 and/or 520, without interaction from a driver and/or from a processor that is external to the graphics processing device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for controlling a 3D processor using a control list in memory.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for graphics processing, the method comprising:
in a graphics processing device:
determining screen coordinates of vertices of primitives in a frame to be processed;
identifying tiles that are overlapped by the primitives, based on the screen coordinates of the vertices of the primitives;
generating a plurality of control sub-lists corresponding to the respective tiles, said generation comprising:
generating, by a first processor, a control sub-list of a tile, the control sub-list comprises primitive data interspersed with control data for processing said primitive data, the primitive data comprises data corresponding to the vertices of the primitives that overlap the respective tile;
discarding, by the first processor, the screen coordinates; and
linking, by the first processor, a main control list corresponding to the frame to be processed, to the control sub-list of the tile, wherein at least one pointer links the main control list to the control sub-list; and
rendering, by a second processor, the tile based on the control sub-list corresponding to the tile generated by the first processor, wherein the rendering comprises:
processing said primitive data in a primitive pipeline;
processing said control data in a control pipeline; and
synchronizing the processing of said primitive data with corresponding control data.

2. The method according to claim 1, comprising controlling said rendering utilizing one or more tags that correspond to one or more-records within the control sub-list.

3. The method according to claim 1, wherein the tile is a first tile of the frame and the control sub-list corresponding to the first tile is a first control sub-list, the method further comprising:
rendering, by the second processor, a second tile in parallel with the generation of the control sub-list of the first tile, wherein the second tile is rendered based on a second control sub-list corresponding to the second tile.

4. The method according to claim 1, wherein one or more of said control lists comprise a tile list.

5. The method according to claim 4, wherein said tile list comprises compressed index values for a plurality of primitive vertices of the primitive data.

6. The method according to claim 1, wherein at least one of the plurality of control sub-lists comprises embedded branch records.

7. The method of claim 6, wherein the embedded branch records comprise a list of multiple chained memory blocks, the multiple chained memory blocks being processed within the at least one of the plurality of control sub-lists.

8. The method according to claim 1, wherein the control data is categorized into a first type of control data and a second type of control data, and wherein the first type of control data is processed in a separate pipeline than a second pipeline that processes the second type of control data.

9. A system for graphics processing, the system comprising:
one or more processors and/or circuits for use in a graphics processing device, wherein said one or more processors and/or circuits are operable to:
divide a screen space in a plurality of tiles;
generate a first control list corresponding to a first tile among the tiles based on 3D graphics overlapping the first tile, wherein interspersed records within the first control list comprise:
primitive data for said 3D graphics overlapping the first tile;
a plurality of pointers to said primitive data; and
control data for processing said primitive data; and
render 3D graphics overlapping a second tile among the tiles, in parallel to said generation of the first control list, the rendering of the second tile based on a second control list corresponding to the second tile, and the rendering comprising:
categorization of the control data in the second control list into a plurality of different types of control data;
push the control data into a plurality of control FIFOs, the plurality of control FIFOs corresponding to the plurality of different types of control data; and
process the primitive data in the second control list in a separate primitive data pipeline.

10. The system according to claim 9, wherein said one or more processors and/or circuits are operable to process portions of said 3D graphics in parallel.

11. The system according to claim 9, wherein said one or more processors and/or circuits are operable to process said 3D graphics on a tile by tile basis, wherein a tile comprises a portion of said 3D graphics and a 3D frame comprises a plurality of said tiles.

12. The system according to claim 9, wherein said one or more processors and/or circuits are operable to render said 3D graphics in said first tile in parallel to generation of a third control list corresponding to a third tile, the rendering of the first tile based on the first control list.

13. The system according to claim 9, wherein said the plurality of control lists comprises a main control list and/or one or more control sub-lists.

14. The system according to claim 9, wherein the plurality of control lists comprises a first pointer of the plurality of pointers that directs the processing of said 3D graphics to a plurality of vertex data of the primitive data.

15. The system according to claim 9, wherein said one or more processors and/or circuits are operable to tag a control record of the control data with a control data tag and a primitive of the primitive data with a primitive data tag in response to processing the control record, wherein the control data tag corresponds to the primitive data tag.

16. The system according to claim 15, wherein the primitive data tag is applied to synchronize processing of the primitive data in at least one data pipeline with the control data in the plurality of control FIFOs by matching the primitive data tag to the control data tag.

17. The system of claim 9, wherein said one or more processors and/or circuits are operable to:
calculate first screen coordinates of the 3D graphics overlapping the first tile to generate the first control list;
discard the first screen coordinates after generation of the first control list; and
calculate second screen coordinates of the 3D graphics overlapping the first tile to render the first tile.

18. A device for graphics processing, the device comprising one or more processors, the one or more processors operable to:
fetch a plurality of control data;
generate, by a first processor, a first control sub-list corresponding to a first tile from a plurality of tiles of a frame of 3D graphics, wherein the first control sub-list comprises control data and primitive data of the 3D graphics overlapping the first tile, and the first control sub-list is generated in parallel with rendering of a second tile, by a second processor, based on a corresponding second control sub-list, the rendering of the second tile comprising;
- categorization of the control data in the second control sub-list into a plurality of control data types;
- transfer of the control data into a plurality of control FIFOs corresponding to the plurality of control data types; and
- transfer of the primitive data into at least one processing FIFO for processing the 3D graphics.

19. The device according to claim 18, wherein the at least one processing FIFO, corresponding to the primitive data, comprises a separate pipeline from the plurality of control FIFOs.

20. The device according to claim 18, wherein the one or more processors operable to:
- calculate first screen coordinates of the 3D graphics overlapping the first tile to generate the first control sub-list;
- discard, by the first processor, the first screen coordinates and transfer the first control sub-list for rendering without the first screen coordinates; and
- calculate second screen coordinates of the 3D graphics overlapping the first tile to render the first tile according to the first control sub-list.

* * * * *